Patented Nov. 21, 1933

1,935,717

UNITED STATES PATENT OFFICE 1,935,717

SYNTHETIC PRECIOUS STONE

Max Jaeger and Hermann Espig, Bitterfeld, Germany, assignors to I. G. Farbenindustrie Aktiengesellschaft, Frankfort - on - the - Main, Germany No Drawing. Application April 25, 1931, Serial No. 532,985, and in Germany April 16, 1930

4 Claims. (Cl. 106—36.1)

The present invention relates to the production of synthetic precious stones and is more particularly concerned with a process for producing a synthetic yellow spinel.

According to the present invention a synthetic yellow spinel is obtained by adding both manganese and iron as colouring ingredients to the raw material mixture usually employed for making synthetic spinels which consists of about 85 parts by weight of $Al_2O_3$ and 15 parts by weight of MgO in finely powdered and intimately mixed form. This effect of the combined metals is the more surprising, as manganese alone when employed in the proportions at present in question produces no colouring effect whatever, whereas the presence of iron alone yields a rose-coloured spinel. The addition of manganese and iron may be effected either by adding the metals as such or in the form of compounds, preferably the respective oxides.

*Example*

To a basic mixture consisting of about 90 parts by weight of $Al_2O_3$ and about 10 parts by weight of MgO, 4 percent of manganese oxide ($Mn_2O_3$) and 1 percent of iron are added, and the resulting mixture is fused into bulbs according to Verneuil.

By further adding a small percentage (about 1 to 2 percent) of oxide of zinc, the fusing of the stones is facilitated and the colour enhanced, although oxide of zinc when employed alone has no colouring effect.

We claim:

1. A synthetic yellow spinel containing alumina and magnesia in proportions yielding an artificial spinel and having incorporated therein about 4 percent of manganese oxide and about 1% of iron.

2. A synthetic yellow spinel containing alumina and magnesia in proportions yielding an artificial spinel and having incorporated therein about 4% of manganese oxide, about 1% of iron and between about 1 and about 2% of zinc oxide.

3. A composition of matter adapted to produce a synthetic yellow spinel, when fused, which comprises a basic mixture of alumina and magnesia in proportions yielding an artificial spinel and having incorporated therein about 4% of manganese oxide and about 1% of iron.

4. A composition of matter adapted to produce a synthetic yellow spinel, when fused, which comprises a basic mixture of alumina and magnesia in proportions yielding an artificial spinel and having incorporated therein about 4% of manganese oxide, about 1% of iron and between about 1% and about 2% of zinc oxide.

MAX JAEGER.
HERMANN ESPIG.